United States Patent [19]

Lenoir

[11] Patent Number: 5,166,957
[45] Date of Patent: Nov. 24, 1992

[54] BUS INTERCONNECTION AND EXTENSION DEVICE IN A DATA TRANSMISSION NETWORK

[75] Inventor: Dominique Lenoir, Meudon-La-Foret, France

[73] Assignee: Regie Nationale des Usines Renault, Boulogne-Billancourt, France

[21] Appl. No.: 557,656

[22] Filed: Jul. 25, 1990

[30] Foreign Application Priority Data

Jul. 25, 1989 [FR] France .................. 89 09973

[51] Int. Cl.⁵ .............................. H04B 3/00
[52] U.S. Cl. ............................ 375/36; 364/483; 307/443
[58] Field of Search .......... 375/36, 76, 121; 364/483, 495; 324/509; 307/443

[56] References Cited

U.S. PATENT DOCUMENTS 4,498,021  2/1987  Uya .................... 307/443
4,670,713  6/1987  Scheib ................. 364/483
4,731,689  3/1988  Nimmersjo et al. ....... 364/483
4,782,300  11/1988  Bonaccio et al. ........ 375/36

FOREIGN PATENT DOCUMENTS 0081335  6/1983  European Pat. Off. .
2185666  7/1987  United Kingdom .

Primary Examiner—Stephen Chin
Attorney, Agent, or Firm—Oblon, Spivak, McClelland, Maier & Neustadt

[57] ABSTRACT

But interconnection device in a data transmission network where each bus connects multiple modules or stations, characterized by the fact that it comprises electronic comparator (51) for receiving the voltages of various buses and delivering a corresponding voltage to the extreme voltage of various input voltages. A correction device (52) applies a slight deviation to the extreme voltage and a distribution circuit (53) provides the corrected voltage to various buses (1 to 4).

4 Claims, 4 Drawing Sheets

BUS INTERCONNECTION AND EXTENSION DEVICE IN A DATA TRANSMISSION NETWORK

BACKGROUND OF THE INVENTION

This invention relates to a bus interconnection device in a data transmission network by multiplexing where each bus connects multiple modules or stations.

DISCUSSION OF BACKGROUND

Data transmission networks comprising several stations thanks to which data is exchanged between the stations are known.

In these networks, the master stations are distinguished from the slave stations. A master station can gain access to the network at any moment while a slave station can reply only upon polling.

In the networks using a single or multiple electrical connection and a protocol of random access for transmission support, the number of stations able to be connected to the network is limited by the line interfaces assuring the interface between the stations and the network. A line interface constitutes a load and the number of loads which can be connected to a bus is a function of the electrical characteristics of the line interface.

To increase the number of stations of a network beyond the possibilities of line interfaces, it is necessary to resort to a structure using a bus supervisory element which orchestrates the direction of transfer of the data between the various buses. This limits the structure and calls for constraints on the type of module (master or slave) installed on the buses.

SUMMARY OF THE INVENTION

This invention has as its object to provide a device for bus interconnection making possible the increase of the number of connected stations by preventing constraints described in the preceding paragraph (network manager or supervisor). The network acts as a single bus to which all the stations are connected. Relative to line interfaces, the buses are individualized and only the stations connected to the same bus are accounted for as a load on this bus. This device applies to buses with random access and with nondestructive collision detection.

According to the invention, the device is characterized by the fact that it comprises electronic comparison means receiving the voltages of various buses and delivering a voltage corresponding to the extreme voltage of various input voltages and correction means applying a slight deviation to said extreme voltage and means of distribution of said corrected voltage to the various buses.

According to a characteristic, the electronic comparison means consist of an operational voltage amplifier receiving the voltages of various buses at the input.

The distribution means consist of a diode circuit receiving the corrected voltage and applying said voltage to each bus.

BRIEF DESCRIPTION OF THE DRAWINGS

The invention will now be described with more detail with reference to embodiments given by way of examples and shown in the accompanying drawings in which.

DETAILED DESCRIPTION OF THE PREFERRED EMBODIMENT

Figure 1:
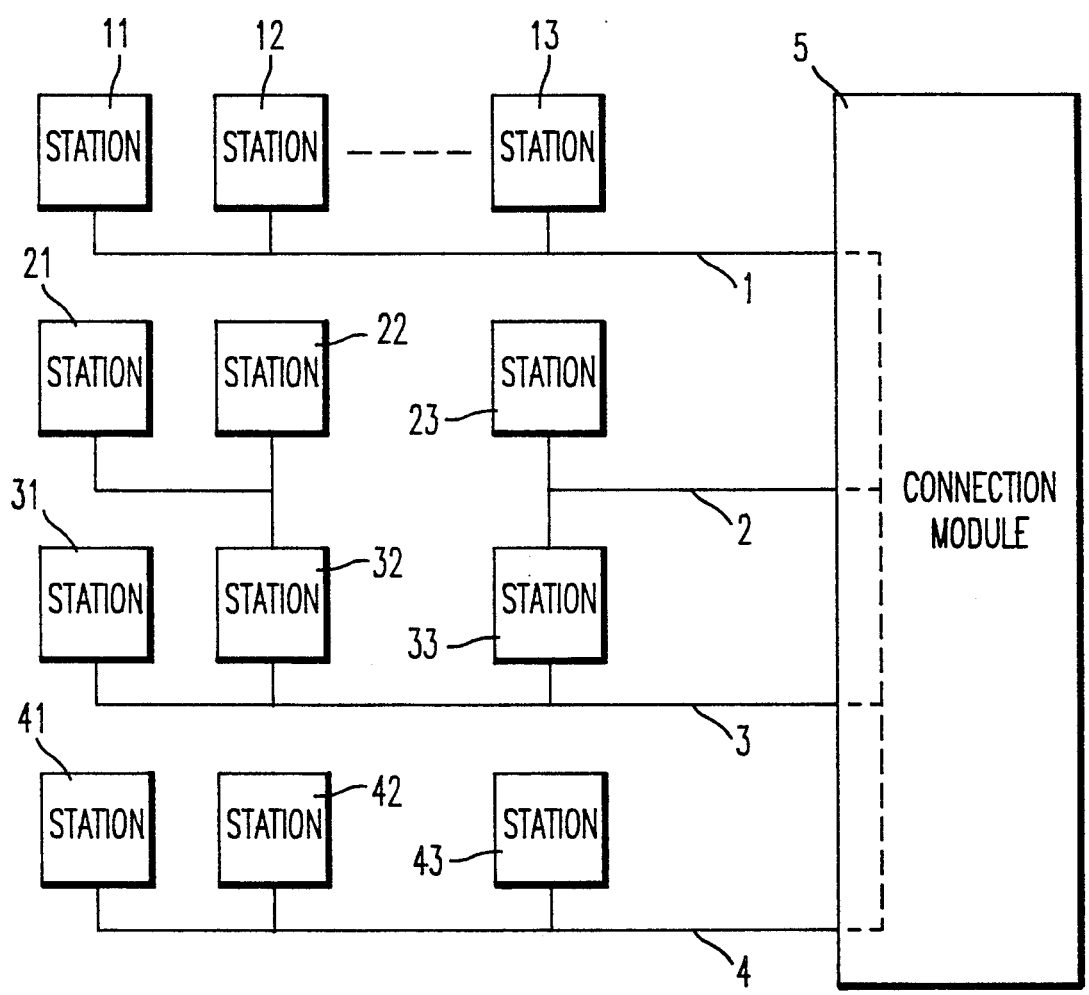
FIG. 1 is a diagram of a network equipped with the device according to the invention.

A star-shaped network which comprises multiple buses 1 to 4 achieving the transfer of data and commands is seen in FIG. 1. The system can be extended to n buses. The function of routing data between the buses is assured by a connection module 5. The number of buses, 4 here, is given by way of indication. Each bus connects multiple master or slave stations. These stations are referenced 11 to 13 on the line of bus 1, 21 to 23 on the line of bus 2, 31 to 33 on the line of bus 3 and 41 to 43 on the line of bus 4.

Each bus exhibits a dominant or recessive voltage state. The voltages of each bus are comprised in interval [O, Vcc].

According to a first solution, the dominant state corresponds to a voltage comprised in interval [O, Vcc/2], and the recessive state corresponds to a voltage comprised in interval [Vcc/2, Vcc].

According to a second solution, the dominant state corresponds to a voltage comprised in interval [Vcc/2, Vcc] and the recessive state corresponds to a voltage comprised in interval [O, Vcc/2].

The 2 solutions can be used simultaneously in the case of a differential bus comprising two transmission wires.

In the case where a voltage with a dominant nature and a voltage with a recessive nature are applied simultaneously (collision) on the same bus, the dominant voltage is predominant.

Figure 2:
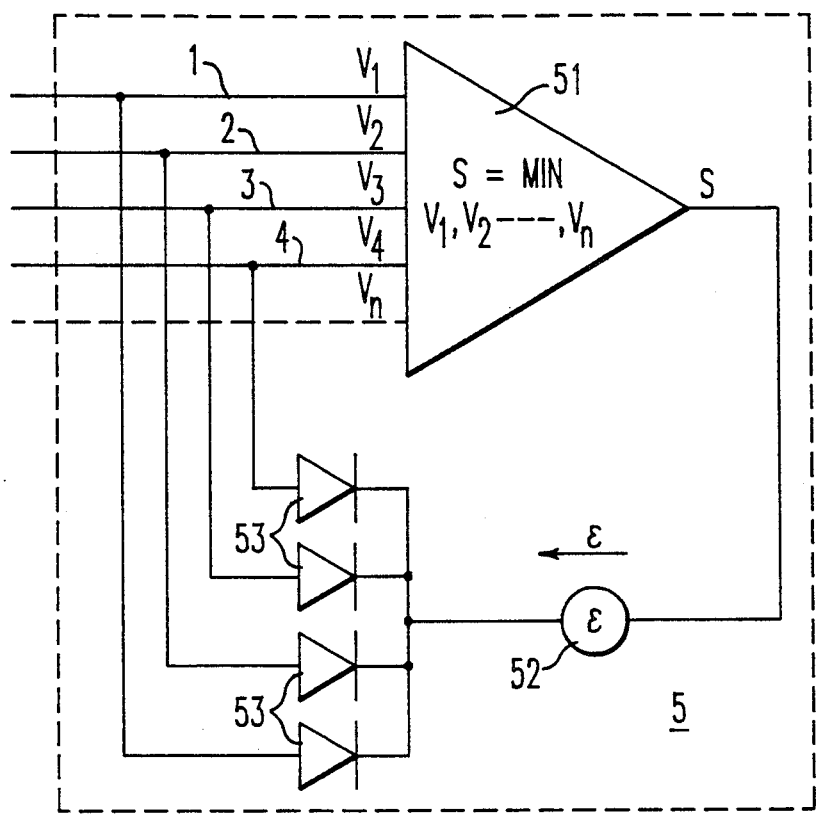
FIG. 2 is a block diagram of the connection device according to the invention.

In the embodiment of FIG. 2, the voltage in the dominant state is in interval [O, Vcc/2]. Each bus is at a graded voltage Vi relative to the ground. If Vmin is the lowest voltage measured on a given bus at any moment, module 5 applies to all the buses a maximum voltage which is equal to Vmin increased by a voltage deviation $\epsilon$, this voltage deviation being slight relative to Vcc.

Figure 3:
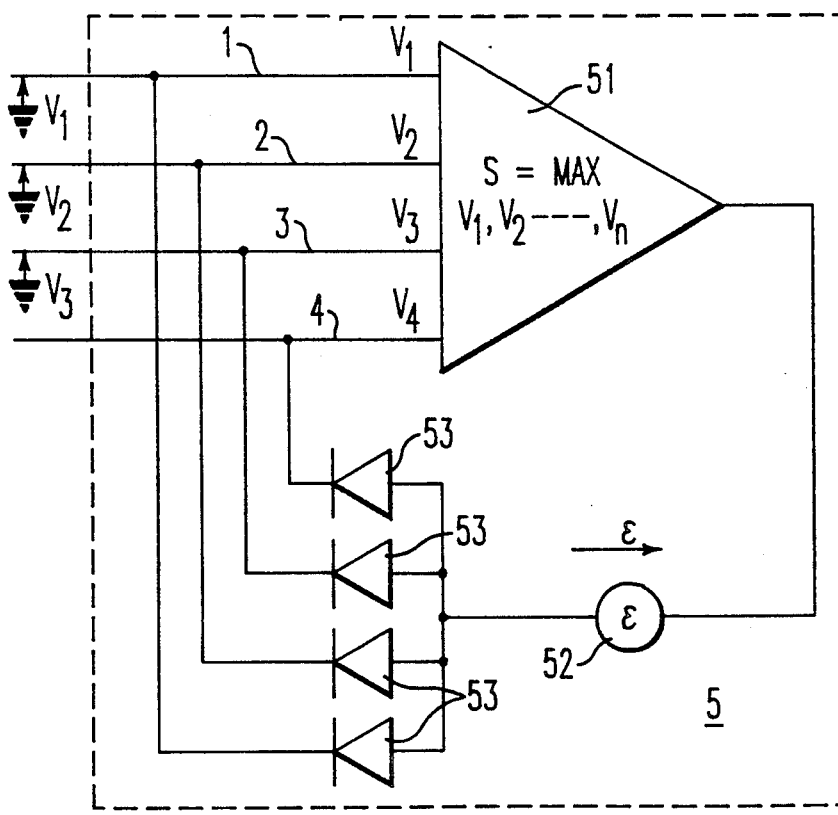
FIG. 3 is a block diagram of a variant of the device of FIG. 2.

In the embodiment of FIG. 3, the voltage in the dominant state is in interval [Vcc/2, Vcc]. Each bus has a graded voltage Vi relative to the ground. If Vmax is the highest voltage measured on a given bus at any moment, module 5 applies to all the buses a minimum voltage equal to Vmax reduced by a voltage deviation $\epsilon$, this voltage deviation being slight relative to Vcc.

In each embodiment, the addition or the subtraction of voltage deviation $\epsilon$ makes it possible to prevent a locking and assures a safety margin.

Connection module 5 illustrated by FIGS. 2 to 5 comprises an operational amplifying circuit 51 receiving the various buses and providing a voltage to a circuit 52 which provides a voltage to various buses 1 to 4 by diodes 53.

Figure 4:
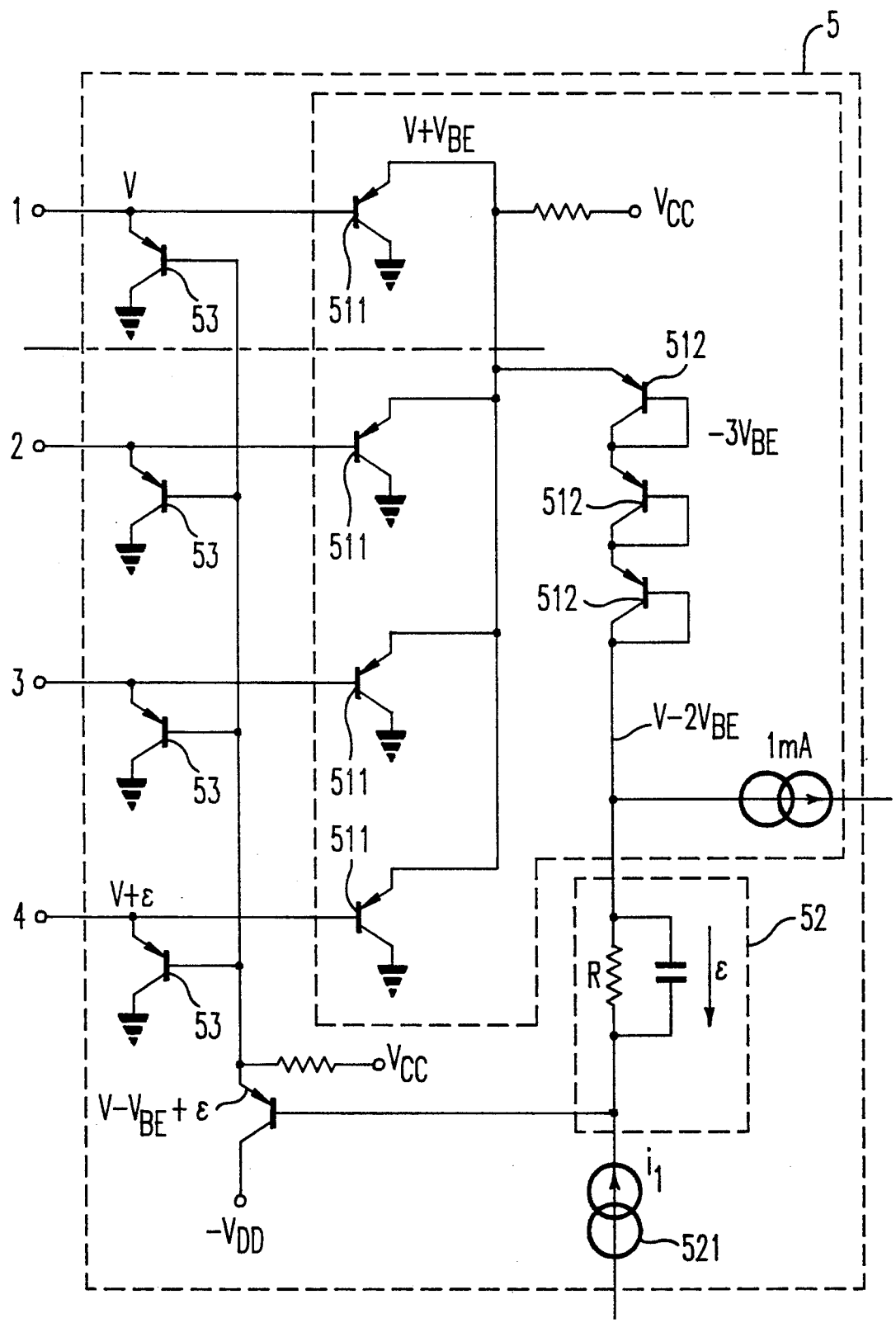
FIG. 4 is an electrical diagram of the device of FIG. 2.
Figure 5:
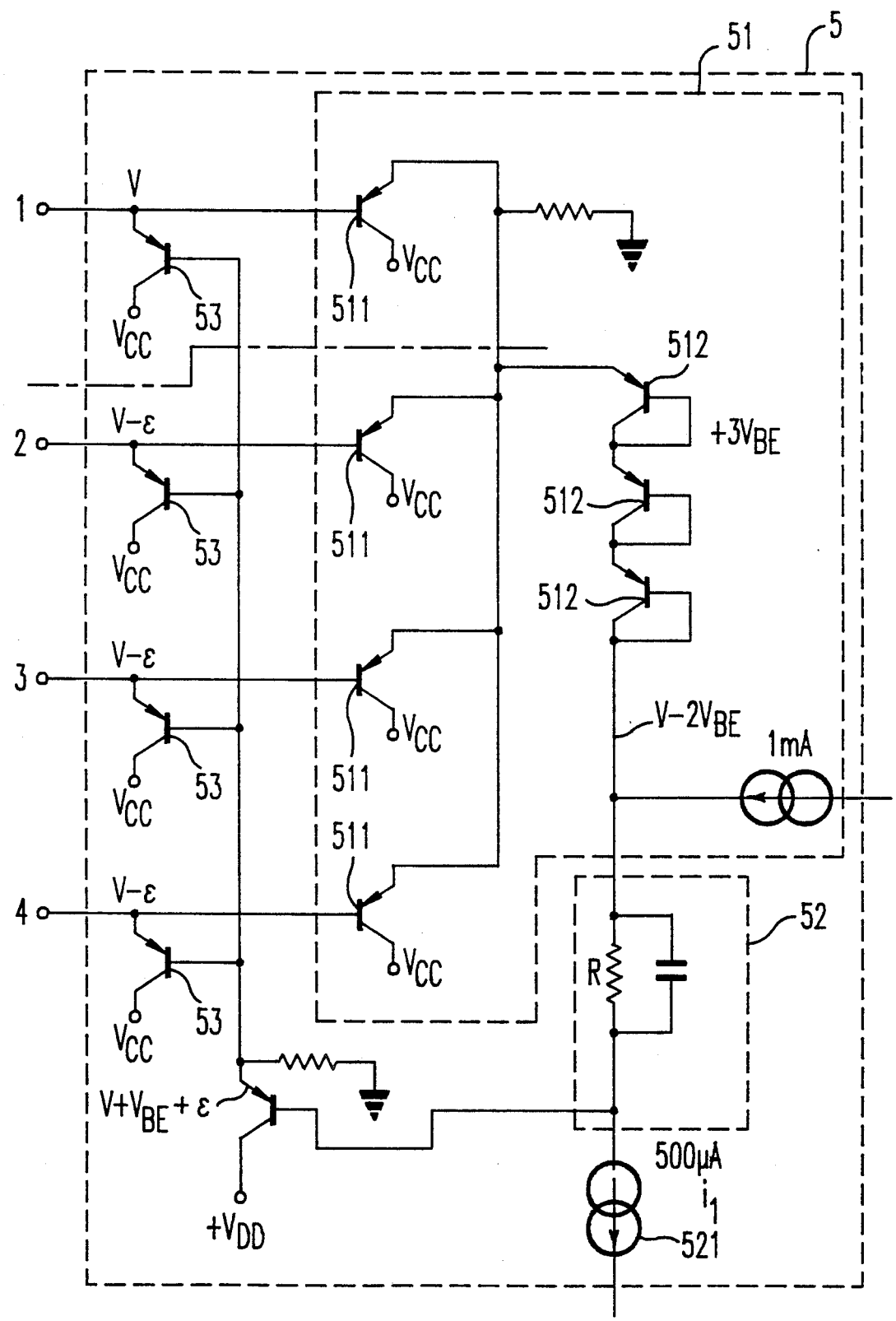
FIG. 5 is an electrical diagram of the device of FIG. 3.

This module is illustrated in more detail in FIGS. 4 and 5. Circuit 5 comprises:

transistors 511 which compare the voltages and provide a voltage corresponding to the lowest (FIG. 4) or to the highest (FIG. 5) of the voltages on the various buses.

Transistors 512 compensate the low-emitting voltages of various transistors 511.

The correction means consists of a filter joined to a current generator $i_1$ 521.

Transistors 53 mounted in voltage follower transcribe the voltage provided by comparator Si and fit the impedance to the buses.

It is well understood that variants and improvements of detail can be imagined and also the use of equivalent means can be considered without going outside the scope of the invention.

I claim:

1. A bus interconnection device in a data transmission network where each bus connects multiple modules or stations, said device comprises:

electronic comparison means receiving the voltages of various buses and delivering a voltage corresponding to the extreme voltage of various input voltages;

correction means applying a slight deviation to said extreme voltage; and means for distributing said corrected voltage to said various buses.

2. Device according to claim 1, wherein said electronic comparison means consist of an operational voltage amplifier receiving the voltages of various buses at the input.

3. Device according to any one of claims 1 or 2, wherein correction means consist of a filter.

4. Device according to any one of claims 1 or 2, wherein distribution means consist of a diode circuit receiving the corrected voltage and applying said voltage to each bus.

* * * * *